UNITED STATES PATENT OFFICE.

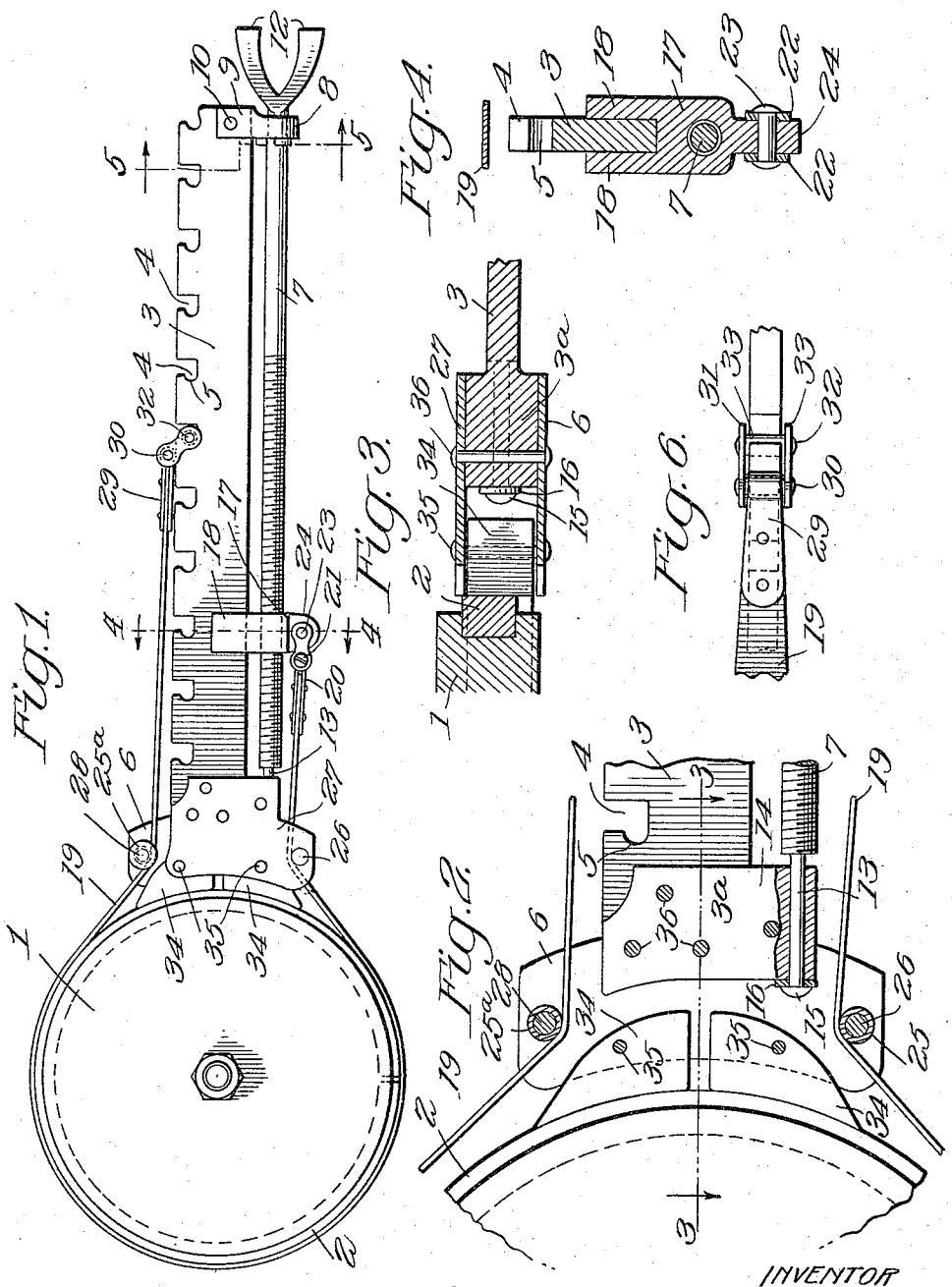

JOHN A. EIKELBERGER, OF BENNINGTON, KANSAS.

PISTON-RING COMPRESSOR.

1,147,625.  Specification of Letters Patent.  Patented July 20, 1915.

Application filed March 27, 1915. Serial No. 17,422.

*To all whom it may concern:*

Be it known that I, JOHN A. EIKELBERGER, a citizen of the United States, and a resident of Bennington, in the county of Ottawa and State of Kansas, have invented a new and useful Improvement in Piston-Ring Compressors, of which the following is a specification.

My invention is an improvement in piston ring compressors, and the invention has for its object to provide a device of the character specified, for compressing the rings of the piston of an engine, as for instance, an explosion engine, to permit the piston to be replaced in the cylinder, and wherein the compressor in addition to compressing the ring in such manner that it will enter the cylinder also provides a handle for manipulating the piston and the rings.

In the drawings: Figure 1 is a top plan view of the compressor in use, Fig. 2 is an enlarged detail view of a portion of Fig. 1, with parts in section, Fig. 3 is a section on the line 3—3 of Fig. 2, looking in the direction of the arrows adjacent to the line, Figs. 4 and 5 are sections on the lines 4—4 and 5—5, respectively, each looking in the direction of the arrows adjacent to the line, and Fig. 6 is a detail top plan view of the connection of one end of the strip.

The present embodiment of the invention is shown in connection with a piston 1 of an engine, the said piston having the usual annular grooves for receiving the piston rings 2 which are in the form of split rings, as shown.

The compressing device comprises a shank or handle 3, having one side edge plain and having the other side edge provided with series of notches or recesses 4, the said notches being similar in shape and arranged in spaced relation and each notch or recess has that wall adjacent to the piston undercut as indicated at 5. Each notch or recess is thus in effect a bayonet slot. That end of the shank which when in use will be adjacent to the piston, is enlarged to form a head 3ª, and a cross head 6 is secured to the under surface of the said head in a manner to be later described, and a threaded rod 7 is journaled parallel with the shank on the opposite side from the notches 4. This rod is supported at the end remote from the cross head by a bearing stirrup, comprising a body 8, in which the rod is journaled, and arms 9 extending on opposite faces of the shank 3, and the arms are secured to the shank by a rivet 10 or the like.

A cotter pin 11 is passed transversely of the rod at the inner side of the body of the bearing, and the arms of the pin are bent in opposite directions as shown more particularly in Fig. 5. Thus the cotter pin limits the movement of the rod away from the piston, and the rod is provided on the opposite side of the bearing with a fork 12 for permitting the rod to be turned. The opposite end of the rod from the fork is reduced as shown at 13, and is passed through an extension 14 of the head 3ª, before mentioned, and on the opposite side of the extension from the bearing 8 the reduced portion is headed as shown at 15. A washer 16 is arranged between the head and the adacent edge of the head 3ª, and a plate 27 is secured to the shank and to the cross head in a manner to be described. Thus the rod is free to rotate in its bearings in the bearing fork 8, and in the bearing plate 14, and the rod may be rotated by means of the head or fork 12.

A nut is mounted on the rod, the nut comprising a body 17 having a threaded opening through which the rod extends and arms 18, which embrace opposite faces of the shank 3, and are slidable thereon. The compressing device proper is in the form of a strip 19 of suitable length and of a width to cover the periphery of the ring 2. This strip is connected at one end to the nut 17—18. A clip 20 is secured to the said end of the strip, the clip being in the form of a strip doubled upon itself, and engaging opposite faces of the end of the strip 19, and the ends of the strip 29 are secured to the end of the strip 19 by rivets. A screw 21 is journaled in the body of the clip 20 at the end of the strip 19, and the ends of the screw are passed through links 22 arranged on opposite sides of the clip 20. A rivet 23 is passed through the opposite ends of the links, and through a depending perforated lug 24 on the nut to pivotally connect the links to the nut. From the nut the strip 19 passes over a roller 25, which is journaled on a pin 26, supported by the adjacent end of the cross head and by the plate 27, arranged on the opposite side of the head 3ª from the cross head. Thus the roller 25 is journaled between the plate 27 and the cross head and at the opposite end of the cross head a second roller 25ᵃ is provided, the said roller being journaled on a headed pin 28 supported by the cross head and extending laterally therefrom.

The strip 19 passes from the nut 18 on the inner side of the roller 25, and then forms a loop, the opposite end of the strip passing on the inner side of the roller 25ᵃ to a detachable connection with the notches 4. The body of the strip is designed to encircle the piston and ring. That end of the strip 19 remote from the nut has secured thereto a U-shaped clip 29, corresponding to the clip 20, and a rivet 30 is journaled in the body of the clip 29. Links 31 are journaled at one end on the rivet 30 and at the opposite sides of the strip 19, and the other ends of the links are journaled on a rivet 32.

A sleeve or arbor 33 is arranged on the rivet 32 between the links and the said sleeve or arbor is designed to engage one of the notches 4. The roller or arbor 33 is received within the undercut portion 5 of the notch, and it will be evident that the detachable holding device, constituted by the rivets 30 and 32 and the links 31, may be connected with any notch of the series.

Bearing blocks or shoes 34 are mounted between the cross head and the plate 27 for engaging the piston rings, and the said blocks are pivoted on rivets 35, which connect the plate 27 before mentioned, with the cross head. Other rivets 36 are passed through registering openings in the plates 14 and 27 and in the head 3ᵃ, and through registering openings in the plates 14 and 27 and in the shank for securing the plates 14 and 27 to the shank and head. The edges of the bearing blocks or shoes 34 which engage the piston ring are curved to fit the rings as shown, and since these blocks or shoes are pivoted, they can accommodate themselves to different size pistons and piston rings.

In operation the rod 7 is turned by means of the head or fork 12 until the nut 17 is adjacent to the plate 27, that is, until the nut is adjacent to the head 3ᵃ of the shank. That portion of the strip 19 which forms a loop between the rollers or pulleys 25 and 25ᵃ is passed around the piston outside of the ring, the strip being so arranged with respect to the ring, that the lower side edge of the ring may be entered in the cylinder before the lower side edge of the strip 19 contacts with the end of the cylinder. With the loop of the strip so placed the rivet 32 is engaged with that opening of the series 4 to which the said rivet may be attached. The opening with which the rivet is connected will of course depend upon the diameter of the piston. The connection is comparatively loose, and when the strip 19 has been properly placed with respect to the piston ring the rod 7 is turned by means of the head 12 to cause the nut 17 to travel toward the bearing 18 to tension the strip 19 around the piston ring. This turning of the rod 7 is continued until the piston ring 2 has been compressed to a point such that it will enter the cylinder, it being understood that the ends of the bearing blocks or shoes 34 are engaged with the ring, as shown in Figs. 1 and 2, prior to tightening the strip 19. When the piston ring has been compressed so that it will enter the cylinder, the strip may be relaxed or loosened by turning the rod 7 in the opposite direction to permit the loop of the strip 19 to be slid longitudinally of the piston to engage the succeeding ring. Each ring is compressed in turn until all have entered the cylinder.

I claim:—

1. A piston ring compressor, comprising a shank, bearing blocks pivoted to the shank at one end for engaging the periphery of the ring, a roller journaled adjacent to each block and at the outer side thereof and perpendicular to the shank, a strip of flexible material adapted to encircle the ring to compress the same, the ends of the strip engaging the rollers at the inner sides thereof, the shank having at one side edge a series of notches, the notches being arranged in spaced relation, and each notch having the wall adjacent to the bearing blocks undercut, a loop secured to the end of the strip adjacent to the notches and adapted to engage one of said notches, a nut pivoted to the other end of the strip at the opposite side of the shank, and a threaded rod journaled at the said edge of the shank and supported by the shank, said rod having a head at the outer end of the shank for permitting the rod to be rotated, and the nut engaging the rod, said nut having arms extending on opposite faces of the shank for guiding the nut.

2. A piston ring compressor, comprising a shank, bearing blocks pivoted to the shank at one end for engaging the periphery of the ring, a roller journaled adjacent to each block and at the outer side thereof and perpendicular to the shank, a strip of flexible material adapted to encircle the ring to compress the same, the ends of the strip engaging the rollers at the inner sides thereof, the shank having at one side edge a series of notches, the notches being arranged in spaced relation, and each notch having the wall adjacent to the bearing blocks undercut, a loop secured to the end of the strip adjacent to the notches and adapted to engage one of said notches, a nut pivoted to the other end of the strip at the opposite side of the shank, and a threaded rod journaled at the said edge of the shank and supported by the shank, said rod having a head at the outer end of the shank for permitting the rod to be rotated, and the nut engaging the rod.

3. A piston ring compressor, comprising a shank, a threaded rod arranged alongside the shank at one side edge thereof, bearings on the shank for supporting the rod for rotation with respect to the shank, a nut mounted on the rod, a strip of flexible material for engaging the piston ring to compress the same, the ends of the strip being at opposite sides of the shank and one end of the strip being pivoted to the nut, the body of the strip extending beyond the adjacent end of the shank, means in connection with the opposite side edge of the shank and the adjacent end of the strip for detachably connecting the said end to the shank at various points in the length thereof, bearing blocks at one end of the shank for engaging the ring, said blocks being pivoted to the shank, and rollers at the block and journaled on the shank for engaging outside of the ends of the strip to hold the said ends in approximate parallelism with the shank.

4. A piston ring compressor, comprising a shank having a pair of pivotally mounted oppositely arranged bearing blocks at one end for engaging the piston ring to be compressed, a threaded rod journaled on the shank at one side edge thereof, a strip of flexible material for engaging the ring to be compressed, one end of the strip having an adjustable engagement with the shank at the opposite side edge from the rod, a nut on the rod to which the opposite end of the strip is connected, and rollers journaled on the shank at the outer sides of the bearing blocks for engagement by the strip.

JOHN A. EIKELBERGER.

Witnesses:
EDWARD N. LOTT,
J. H. NELSON.

Copies of this patent may be obtained for five cents each, by addressing the "Commissioner of Patents, Washington, D. C."